Patented Feb. 14, 1933

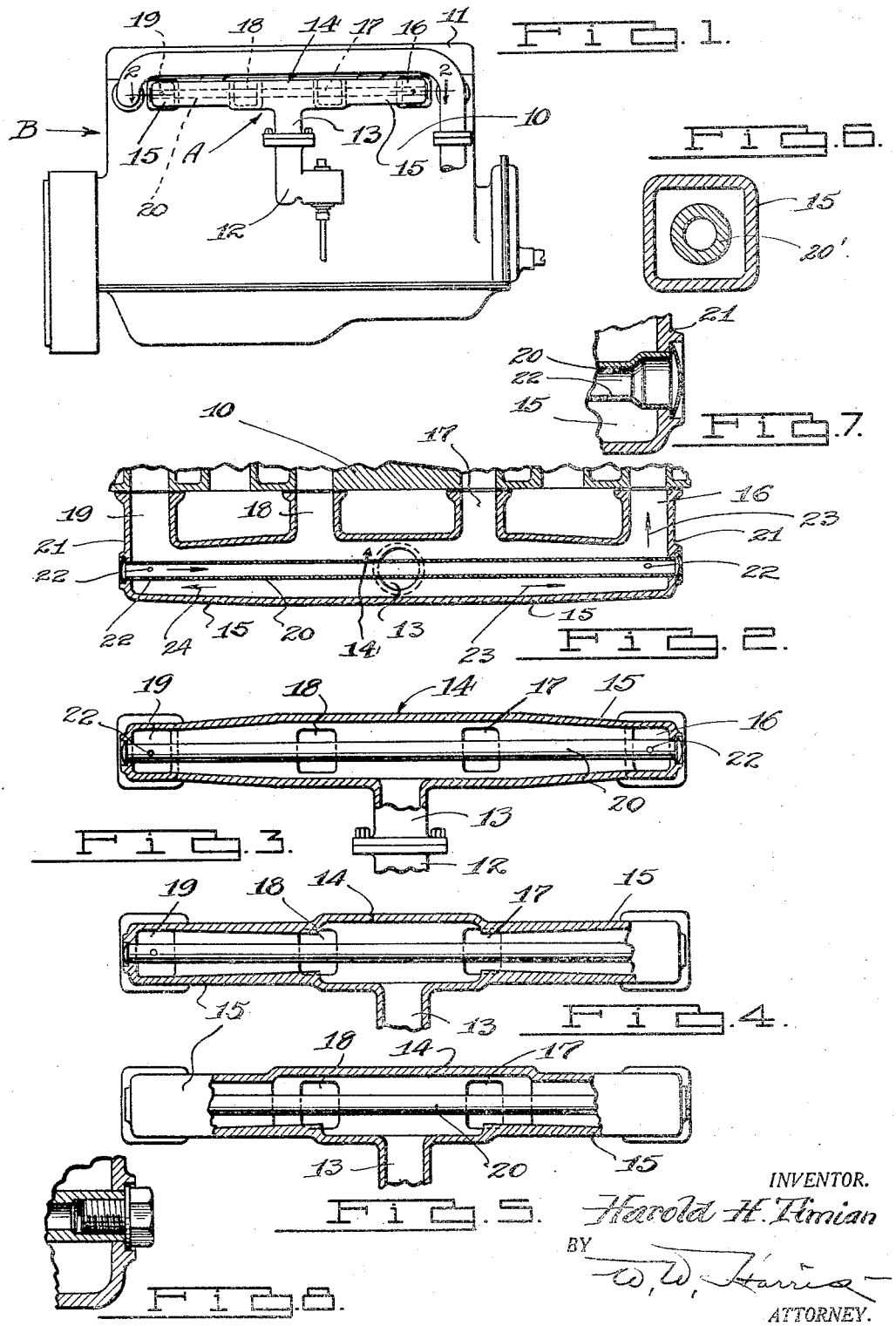

1,897,512

UNITED STATES PATENT OFFICE

HAROLD H. TIMIAN, OF DETROIT, MICHIGAN, ASSIGNOR TO CONTINENTAL MOTORS CORPORATION, OF DETROIT, MICHIGAN, A CORPORATION OF VIRGINIA

ENGINE

Application filed March 2, 1931. Serial No. 519,635.

This invention relates to internal combustion engines and more particularly to an intake manifold structure therefor in which the fuel is distributed to a plurality of cylinders.

It is customary to construct intake manifold structures for internal combustion engines with a central riser disposed substantially at right angles to the longitudinal axis of the header and runner portions, said runners extending in opposite directions from the riser. A plurality of manifold branches are associated with each runner and are adapted for communication with the engine cylinders. In operating such engines it is customary to divide the cylinders into front and rear cylinders which are horizontally fired. Thus, when a cylinder associated with one runner is opened to the engine suction the other runner is closed to the engine suction and consequently there is substantially no movement within the said latter runner.

It is an object of my invention to construct an intake manifold having generally improved fuel mixture distributing means by providing a structure in which the fuel mixture is in motion throughout substantially the entire manifold, thereby increasing in general the engine efficiency and providing an engine which may be more economically operated.

Another object of my invention is to provide a balancing means within the manifold structure of an internal combustion engine that acts to balance the pressures therein and to prevent the formation of pockets or manifold portions in which the fuel mixture remains substantially at rest.

Another object of my invention is to provide means within a manifold structure adapted for assembly with an internal combustion engine for collecting and conducting wet particles of the fuel mixture longitudinally of the runner portions of said manifold centrally thereof.

A further object of my invention is to facilitate the production and manufacture of internal combustion engines by providing manifold structures adapted for use with engines of various construction which normally require manifolds constructed of various capacities by providing means whereby a common manifold structure may be employed with such engines but which is provided with means whereby the velocity of the fuel flow therein may be controlled.

For a more detailed understanding of my invention reference may be had to the accompanying drawing in which preferred embodiments of my invention are illustrated and in which:

Figure 1 is a side elevational view of an internal combustion engine provided with an intake manifold structure constructed in accordance with my invention, Figure 2 is a horizontal longitudinal sectional view through the manifold structure taken substantially on the line 2—2 of Figure 1, Figure 3 is a vertical longitudinal sectional view of the manifold taken on the line 2—2 of Figure 2, Figure 4 is a similar vertical longitudinal sectional view of a modified construction, Figure 5 is a longitudinal sectional view of a further modified construction.

Figure 6 is a transverse sectional view through a runner portion of the manifold illustrating the assembly therewith of a balancing tube having relatively thicker walls than that illustrated in Figures 2 to 5 inclusive.

Figure 7 is a detailed sectional view of the end structure of a manifold illustrating the means for securing a balancing tube to said manifold structure, and Figure 8 is a fragmentary sectional view illustrating a modified construction for securing the balancing tube to said manifold structure.

My improved manifold structure designated as a whole by the character A is adapted for assembly with an internal combustion engine B which in general is provided with a cylinder block 10, a cylinder head 11 secured thereto and a fuel mixture forming device or carburetor 12.

The manifold structure A is provided with a riser 13 adapted for communication with the fuel mixture forming device 12. However, it may be understood that a down draft carburetor may be employed if so desired and the term "riser" is used in its broad sense and covers other means for connecting the manifold header 14 with a fuel mixture forming device or carburetor which may be of the form shown herein or of down draft type. The riser 13 communicates with the header 14 and said header communicates with oppositely extending runner portions 15 with which are connected the branch manifold portions 16, 17, 18 and 19, said branch portions being adapted for communication with the engine cylinders (not shown). These manifold branches may be each connected with an individual cylinder of the engine or may be each connected with a plurality of engine cylinders. These branches are successively opened to the engine suction and preferably the cylinders at the front of the engine and the cylinders at the rear of the engine are alternately fired and thus for purposes of illustration we might select a firing order which would successively place the manifold branches in communication with the engine suction in the following order: 16, 19, 17, 18. It will thus be noted that when the branch 16 is open go the engine suction the other branches are closed to the engine suction and thus the fuel mixture is moved in response to this engine suction from the riser 13 towards the branch 16, thus having very little if not no effect on fuel mixture contained within the manifold runner lying between the riser and the branch 19, the fuel mixture which is thus contained within the runner intermediate the riser and branch 19 is substantially at rest. Following the opening of the intake valve associated with the branch 16, the intake valve associated with the branch 19 is open thus placing the manifold runner intermediate the riser and branch 19 in open communication with the engine suction and inducing a flow of the fuel mixture therethrough and the mixture within the other portion is unaffected by this engine suction that induces the movement of the fuel mixture in the runner intermediate the riser and branch 19.

I have provided a balancing tube 20 (see Figures 2 to 5 inclusive) which extends preferably the entire length of the manifold header and runners the same being preferably anchored or otherwise secured to the ends 21 of the manifold structure in such a way that the said balancing tube is located substantially axially of said runner portions. Any suitable type of balancing means may be employed for closing the open ends of said balancing tube and adjacent each end of said balancing tube I have provided one or more openings 22 which place the interior of said balancing tube in communication with the outer interior portion of the runners. Thus, if we assume for example that the branch 16 is open to the intake suction of the engine the fuel mixture in that portion of the manifold intermediate the riser 13 and branch 16 is moved in the direction as indicated by arrows 23. The fuel mixture in the runner intermediate the riser 13 and branch 19 is moved in an opposite direction as shown by the arrow 24 and thence through the opening 22 in the tube located adjacent the branch 19 and thence through the tube towards the opening adjacent the branch 16. Since that portion of the tube adjacent said branch 16 is directly subjected to the engine suction, the fuel mixture within the tube tends to flow towards that point of low pressure.

Another advantage resulting from the employment of this balancing tube within the manifold is that it provides means for conducting wet particles of the fuel mixture. As the fuel mixture is drawn into the header 14 a portion of said mixture impinges on the tube 20 and the wet particles are thus moved along the tube towards the branch which is open go the engine suction and is in general whipped off the tube adjacent the branch.

This construction provides an increased area on which the wet fuel particles may cling and thus a better vaporization of the fuel mixture may be obtained since a considerable quantity of said wet particles is conducted through the manifold closely adjacent to the longitudinal axis thereof in direct contact with the major portion of the vaporized fuel.

A further advantage of using a tube of the character described above is that it is possible to use manifolds of substantially similar construction for various size engines. These engines which have different displacements normally require manifolds of different size and construction so that a required volume of fuel may be conducted to the cylinders within the time limit allowed. With engines of relatively greater displacement a manifold having a relatively greater interior cross section is normally employed so that the desired capacity and velocity may be obtained. Smaller engines, that is, engines having relatively smaller displacement do not require manifolds of such size since the desired capacity and velocity may be obtained with the manifold having a smaller cross sectional area. With the construction herein illustrated a desirable capacity and velocity over a range of engine constructions may be obtained by providing tubes of selective size within the manifold to provide a predetermined desired capacity and velocity. This is accomplished by providing a manifold construction which is constructed with manifold portions having a cross sectional area sufficient to obtain the desired capacity and velocity for the maximum size engine. For engines of a smaller size the same manifold may be employed, but tubes having a greater wall thickness may be inserted within said manifold to decrease the capacity of the fuel mixture conducting means. This is illustrated in Figure 6 which shows a tube 20' having a thicker wall than the tube illustrated in Figure 2.

Various types of tubes may be employed and they may be secured to the manifold structure by any suitable means, the particular means in the illustrated embodiment of my invention merely showing one way in which said tubes may be supported and secured to the manifold structure. In Figure 8 I employ a stud or bolt 30 which may be threaded into the internally threaded ends of the tube for anchoring or securing said tube in place whereas in the other figures a "Hubbard" plug is employed to seal the open end of the tubes.

It will be apparent to those skilled in the art to which my invention pertains that various modifications and changes may be made therein without departing from the spirit of my invention or from the scope of the appended claims.

What I claim as my invention is:

1. In a multi-cylinder internal combustion engine, an intake manifold structure having a plurality of branches communicating with the engine cylinders, and means within the manifold structure tending to balance pressures at the branch outlets during the suction stroke of the engine.

2. In a multi-cylinder internal combustion engine, an intake manifold structure having a plurality of branches communicating with the engine cylinders, and a balancing tube within said manifold structure and communicating therewith and tending to balance pressures at the branch outlets during the suction stroke of the engine.

3. In a multi-cylinder internal combustion engine, an intake manifold structure having a plurality of branches communicating with the engine cylinders, and a balancing tube extending longitudinally within said manifold structure and communicating therewith, said tube tending to balance pressures at the branch outlets during the suction stroke of the engine.

4. In a multi-cylinder internal combustion engine, an intake manifold structure having a plurality of branches communicating with the engine cylinders, and a balancing tube extending longitudinally within said manifold structure and comunicating at each end with said manifold structure, said tube tending to balance pressures at the branch outlets during the suction stroke of the engine.

5. In a multi-cylinder internal combustion engine, an intake manifold structure having runners and a plurality of branches communicating with said runners and the engine cylinders, and a tube extending longitudinally within said manifold structure and communicating at each end with said manifold structure whereby to balance the pressures at the ends of said manifold structure, said tube thereby adapted to thereby induce a fuel flow in the runner having branches closed to the engine suction.

6. In a multi-cyclinder internal combustion engine, an intake manifold structure having runners and a plurality of branches communicating with said runners and the engine cylinders, and means within said runners for inducing a fuel flow in the runner having branches closed to the engine suction.

7. In a multi-cylinder internal combustion engine, an intake manifold structure having runners and a plurality of branches communicating with said runners and the engine cylinders, one of said runners having a branch open to the engine suction whereby fuel flow is induced therein, and means within said runners and responsive to the engine suction for inducing fuel flow in the opposite direction in other of said runners having branches closed to the engine suction.

8. In a multi-cylinder internal combustion engine, an intake manifold structure having a fuel mixture inlet, runners extending in opposed directions relative to said inlet, branches communicating with said runners and with the engine cylinders, the branches associated with one runner being closed to the engine suction while a branch associated with the said other runner is open to the engine suction, and means within said runners and responsive to engine suction for simultaneously inducing a flow of fuel mixture in both said runners.

9. In a multi-cylinder internal combustion engine, an intake manifold structure having a fuel mixture inlet, runners extending in opposed directions relative to said inlet, branches communicating with said runners and with the engine cylinders, the branches associated with one runner being closed to the engine suction while a branch associated with the said other runner is open to the engine suction, and a balancing tube secured within said runners and extending longitudinally thereof, said tube provided with openings adjacent the outer ends of said runners adapted for placing the tube in communication with the runners, whereby suction means originating in a branch associated with one runner is communicated to the outer end of said other runner.

10. In an internal combustion engine, an intake manifold having a fuel mixture inlet and runners, branches associated with said runners and communicating with the engine cylinders, and means centrally supported within said runners for collecting and conducting wet particles of the fuel mixture towards the outer ends of said runners.

11. In an internal combustion engine, an intake manifold having a fuel mixture inlet and runners, branches associated with said runners and communicating with the engine cylinders, and means carried by end walls of said runners and centrally supported within said runners for collecting and conducting wet particles of the fuel mixture towards the outer ends of said runners.

12. In an internal combustion engine, an intake manifold having a fuel mixture inlet and runners, branches associated with said runners and communicating with the engine cylinders, and means removably secured and centrally supported within said runners for effecting a predetermined velocity control of the fuel flow in said runners.

13. In an internal combustion engine, an intake manifold having a fuel mixture inlet and runners, branches associated with said runners and communicating with the engine cylinders, and tubular means of predetermined inside and outside diameter centrally supported within said runners for effecting a predetermined velocity control of the fuel flow in said runners.

14. In an internal combustion engine, an intake manifold having a fuel mixture inlet and runners, branches associated with said runners and communicating with the engine cylinders, and tubular means of predetermined dimensions detachably secured to the end walls of the runners and extending centrally longitudinally within said runners, said means communicating at each end thereof with said runners for placing one runner in open communication with suction means originating in the other runner, said means constructed to effect a predetermined velocity control of the fuel flow in said runners.

15. In an internal combustion engine, an intake manifold having a fuel mixture inlet and runners, branches associated with said runners and communicating with the engine cylinders, and means supported within said runners in spaced relation with the walls of the runners and extending longitudinally thereof, said means arranged for collecting and conducting wet particles of the fuel towards the outer ends of said runners.

16. In an internal combustion engine, an intake manifold having a fuel mixture inlet and oppositely extending runners, branches associated with said runners and communicating with the engine cylinders, and a continuous tube extending longitudinally of said oppositely extending runners arranged for collecting and conducting wet particles of fuel towards the outer ends of said oppositely extending runners.

17. In an internal combustion engine, an intake manifold structure having a fuel mixture inlet and oppositely extending runners, branches associated with said runners and communicating with the engine cylinders, and a balancing tube supported within said runners and extending longitudinally thereof, said tube communicating adjacent each end with the outer end portions of said runners and arranged to substantially balance pressures at the branch outlets.

In testimony whereof I affix my signature.

HAROLD H. TIMIAN.